US006744930B1

(12) United States Patent
Perlin

(10) Patent No.: US 6,744,930 B1
(45) Date of Patent: Jun. 1, 2004

(54) VIDEO SCENE GRABBER

(76) Inventor: Kenneth Perlin, 7-13 Washington Sq. North, Apt. 31B, New York, NY (US) 10003

( * ) Notice: Subject to any disclaimer, the term of this patent is extended or adjusted under 35 U.S.C. 154(b) by 0 days.

(21) Appl. No.: 09/476,312

(22) Filed: Dec. 30, 1999

(51) Int. Cl.$^7$ .......................... G06K 9/36; H04N 5/225
(52) U.S. Cl. ..................... 382/284; 348/218.1
(58) Field of Search ....................... 382/284; 348/36–39, 348/218.1, 219.1, 146, 143, 335; 250/234–236, 334; 358/479; 359/727

(56) References Cited

U.S. PATENT DOCUMENTS

| | | | | |
|---|---|---|---|---|
| 3,770,340 A | * | 11/1973 | Cronin et al. ................ | 359/562 |
| 5,416,319 A | * | 5/1995 | Messina ...................... | 250/235 |
| 5,528,290 A | * | 6/1996 | Saund ....................... | 348/218.1 |
| 5,581,637 A | * | 12/1996 | Cass et al. .................. | 382/284 |
| 5,627,585 A | * | 5/1997 | Goldschmidt et al. ...... | 348/142 |
| 5,686,960 A | * | 11/1997 | Sussman et al. .......... | 348/218.1 |
| 5,978,021 A | * | 11/1999 | Kim ......................... | 348/218.1 |
| 6,222,903 B1 | * | 4/2001 | Kim et al. .................... | 378/22 |

* cited by examiner

*Primary Examiner*—Mehrdad Dastouri
*Assistant Examiner*—Virginia Kibler
(74) *Attorney, Agent, or Firm*—Ansel M. Schwartz

(57) ABSTRACT

An apparatus for forming an image. The apparatus includes an image tile capture mechanism for capturing image tiles. The apparatus includes a mechanism for controlling the image tiles the image tile capture mechanism captures. The controlling mechanism is disposed adjacent the image tile capture mechanism. The apparatus includes a mechanism for combining the image tiles into an image. The combining mechanism is connected with the image tile capture mechanism. An apparatus for forming an image. The apparatus includes a low resolution high frame rate image tile capture mechanism which stores P pixels at F frames per second, where P and F are integers greater than or equal to 2. The apparatus includes a mechanism for converting the low resolution high frame rate image tiles captured by the capture mechanism into a high-resolution low frame rate image by storing kNP pixels at F/N frames per second, where K less than or equal to 1 and N is an integer greater than or equal to 2, captured by the capture mechanism.

13 Claims, 4 Drawing Sheets

POSITION D

POSITION A

VIDEO SCENE GRABBER

FIELD OF THE INVENTION

The present invention is related to forming images from image tiles. More specifically, the present invention is related to forming images from image tiles by converting low resolution high frame rate image tiles into high resolution low frame rate images.

BACKGROUND OF THE INVENTION

There are many uses for high resolution, low frame rate surveillance of a scene. For example, all persons with a whiteboard or blackboard in their office would benefit from the ability to recreate the contents of that whiteboard or blackboard over an extended period of time.

Currently, there is no inexpensive way to gather such information for subsequent storage in a computer database. CCD video capture devices are much too low resolution. CCD still cameras are relatively expensive and also have significantly lower resolution than is desired to gather all the information on a typical whiteboard.

The present invention is a simple and low cost device that can be placed in front of or mounted onto the aperture of any existing image capture device that is capable of sequentially capturing a large number of low to moderate resolution images (such as a motion picture film camera, a video camera, or a digital still camera). The present invention is, when used in conjunction with appropriate computer software, effectively trades frame rate for resolution, allowing a low resolution, high frame rate capture device to function as a high resolution, low frame rate capture device. Specifically, if the low resolution device stores P pixels at F frames per second, then the converted system can store kNP pixels at F/N frames per second, where 0.5<k<1.

The resulting sequence of high resolution images can be stored in a computer, in compressed format if desired, and recalled, transmitted or redisplayed as needed.

SUMMARY OF THE INVENTION

The present invention pertains to an apparatus for forming an image. The apparatus comprises an image tile capture mechanism for capturing image tiles. The apparatus comprises a mechanism for controlling the image tiles the image tile capture mechanism captures. The controlling mechanism is disposed adjacent the image tile capture mechanism. The apparatus comprises a mechanism for combining the image tiles into an image. The combining mechanism is connected with the image tile capture mechanism.

The present invention pertains to an apparatus for forming an image. The apparatus comprises a low resolution high frame rate image tile capture mechanism which stores P pixels at F frames per second, where P and F are integers greater than or equal to 2. The apparatus comprises a mechanism for converting the low resolution high frame rate image tiles captured by the capture mechanism into a high-resolution low frame rate image by storing kNP pixels at F/N frames per second, where K less than or equal to 1 and N is an integer greater than or equal to 2, captured by the capture mechanism.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
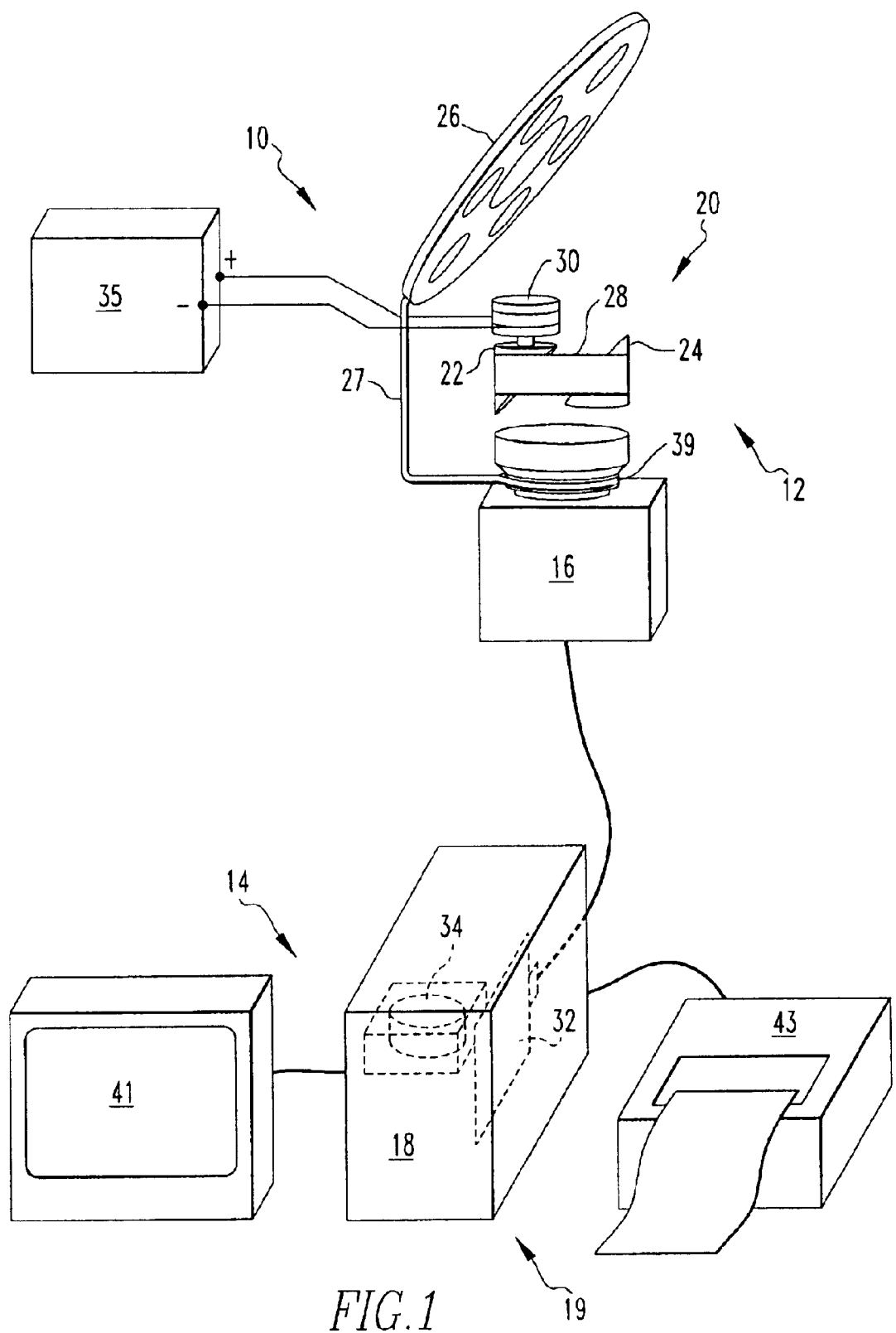
FIG. 1 is a schematic representation of an apparatus of the present invention.

Referring now to the drawings wherein like reference numerals refer to similar or identical parts throughout the several views, and more specifically to figure thereof, there is shown an apparatus 10 for forming an image. The apparatus 10 comprises an image tile capture mechanism 12 for capturing image tiles. The apparatus 10 comprises a mechanism for controlling the image tiles the image tile capture mechanism 12 captures. The controlling mechanism 19 is disposed adjacent the image tile capture mechanism 12. The apparatus 10 comprises a mechanism for combining the image tiles into an image. The combining mechanism 14 is connected with the image tile capture mechanism 12.

Preferably, the image tile capture mechanism 12 includes a camera 16. The controlling mechanism 19 preferably includes a computer 18 which assembles the image tiles into the image.

Preferably, the controlling mechanism 19 includes a mirror system 20 that directs light to the camera 16. The mirror system 20 preferably includes a rotating on-axis mirror 22. Preferably, the mirror system 20 includes a rotating off-axis mirror 24. The mirror system 20 preferably includes stationary off-axis mirrors 26 or prisms disposed such that light is deflected onto the on-axis mirror 22 from the off-axis mirror 24 which then aligns with one of the stationary off-axis mirrors 26 or prisms which create an optical path that allows light to pass through the mirror system 20 into the video camera 16.

Preferably, the controlling mechanism 19 includes a rotating support structure 28 which rotates the on-axis mirror 22 and off-axis mirror 24. The rotating on-axis mirror 22 preferably is angled and the off-axis mirror 24 is angled. Preferably, the controlling mechanism 19 includes an electric motor 30 which rotates the rotating support structure 28.

The capture mechanism 12 preferably includes a digitizing board 32 which digitizes the image tiles captured by the camera 16. Preferably, the capture mechanism 12 includes a memory 34 connected with the computer 18 in which the image tiles digitized by the digitizing board 32 are stored until the computer 18 combines the image tiles into the image. Preferably, the computer 18 includes computer 18 software 36 which processes the image tiles to combine them into the image.

The off-axis angled mirror preferably is parallel to the on-axis angled mirror. Preferably, the off-axis mirror 24, on-axis mirror 22 and the stationary off-axis mirrors 26 or prisms are arranged such that as the electric motor 30 rotates the rotating support structure 28, the off-axis mirror 24 and on-axis mirror 22 aligns with different stationary off-axis mirrors 26 or prisms in succession to cause the camera 16 to capture the sequence of overlapping image tiles until the motor 30 has rotated 360 degrees.

The present invention pertains to an apparatus 10 for forming an image. The apparatus 10 comprises a low resolution high frame rate image tile capture mechanism 38 which stores P pixels at F frames per second, where P and F are integers greater than or equal to 2. The apparatus 10 comprises a mechanism 40 for converting the low resolution high frame rate image tiles captured by the capture mechanism 12 into a high-resolution low frame rate image by storing kNP pixels at F/N frames per second, where K less than or equal to 1 and N is an integer greater than or equal to 2, captured by the capture mechanism 12.

In the operation of the preferred embodiment, the apparatus 10 comprises:
1. Electric power source 35.
2. Stationary support structure 27.
3. Electrical motor 30.
4. Rotating support structure 28.
5. Rotating on-axis angled mirror 22.
6. Rotating off-axis angled mirror 24, parallel to the rotating on-axis angled mirror 22.
7. Stationary off-axis angled mirrors 26 or prisms, arranged in a circle. Each such mirror or prism aims incoming light into a slightly different direction. These collective directions form a rectangular grid.
8. Mounting bracket 39.
9. Video or other sequential-image capture device 16.
10. Video digitizing board 32.
11. Computer 18.
12. Computer secondary (eg: magnetic disk) storage 34.
13. Computer monitor screen 41.
14. High resolution (eg: 300 dpi) printer 43.

Set up operation:
Mount the device onto the front of the video camera 16
Point the device toward the desired direction
Connect the device to electric power supply
Connect the video camera 16 to the input of the computer 18
Start up computer 18 program that "tiles" the image.

User operation while the device is running:
Indicate, on the computer 18 interface, a desired date/time to view;
View the high resolution scene, which is displayed as it appeared at that time;
Print out the high resolution "snap shot" if desired.

Figure 3:
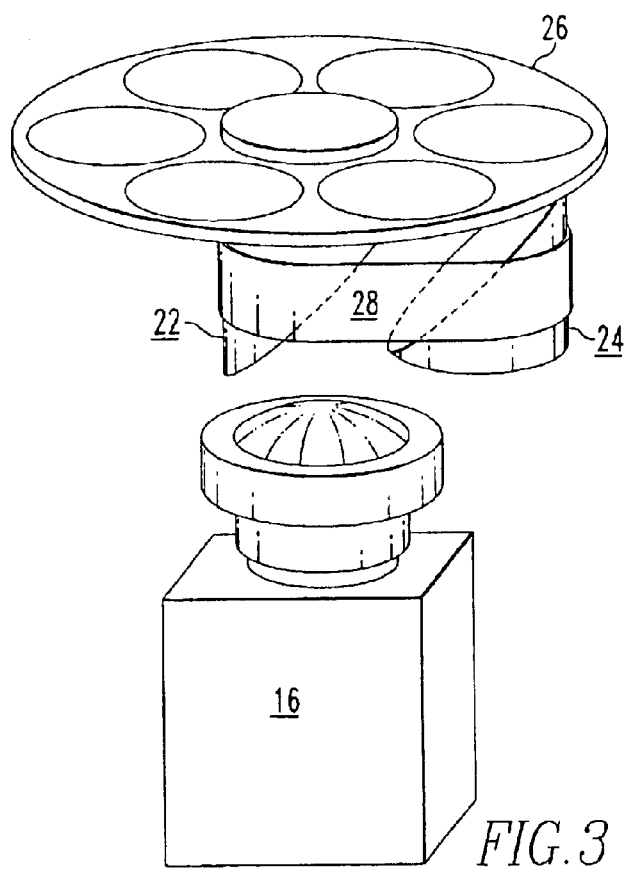
FIG. 3 is a schematic representation of stationary mirrors.

Internal operation:
As shown in FIG. 1, the electric power source 35 drives the electric motor 30, which rotates the rotating support structure 28. Light is deflected onto the rotating on-axis mirror 22 from the rotating off-axis mirror 24, which then lines up with one of the stationary off-axis mirrors 26 or prisms (FIG. 3). This creates an optical path which allows light to pass through the mirror system 20 onto the video camera 16. The images formed on the video camera 16 are digitized by the digitizing board 32, and processed by computer 18 software 36, and assembled into high resolution images. The resulting high resolution images are compressed if desired, by techniques standard in the art, such as by comparing each high resolution image with the previous processed image and only storing the (more readily compressible) difference between them, with every Kth image stored without such comparison, so that any of the K-1 images following this one can be reconstituted by successive image summations. The resulting compressed images are stored on the computer's 18 secondary storage 34.

Because rotating mirrors remain parallel at all times (FIG. 2), the image seen by the video camera 16 remains steady and unmoving for the entire period of time during which there is an optical path in which light is deflected from the scene through a particular stationary off-axis mirror 26 or prism.

Figure 4A:
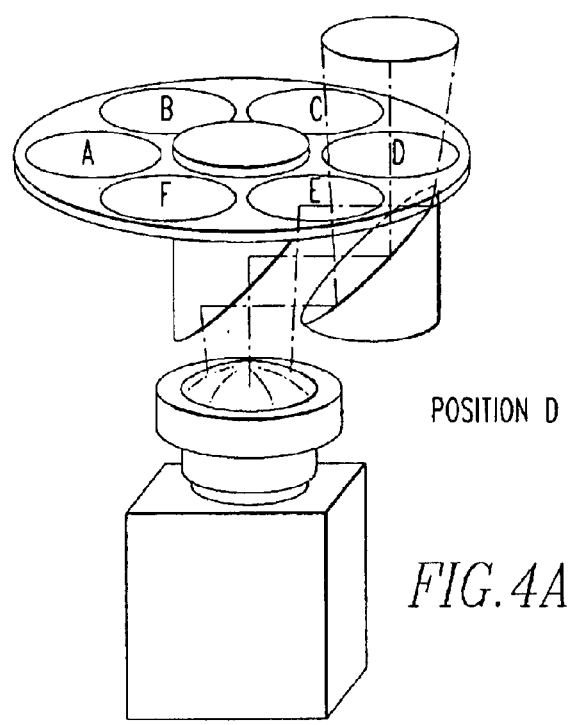
FIG. 4a is a schematic representation of rotary mirrors in a first position.
Figure 4B:
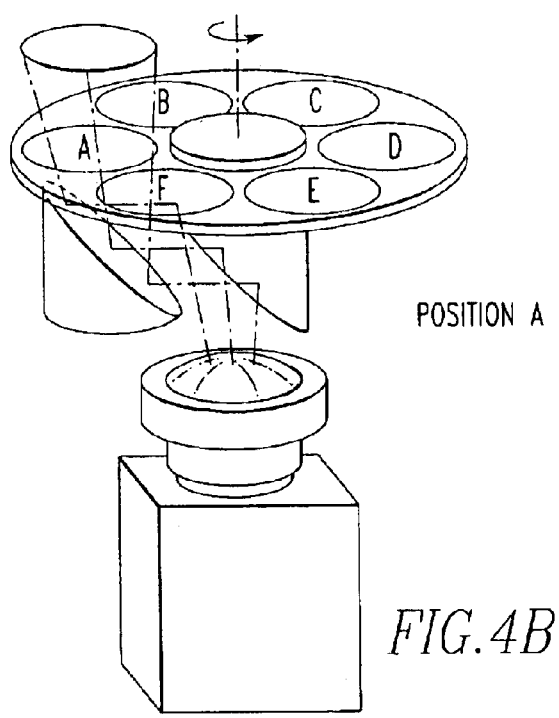
FIG. 4b is a schematic representation of rotating mirrors in a second position.

As the motor 30 continues to rotate the rotating support structure 28, the two parallel rotating mirrors line up with different stationary off-axis mirrors 26 or prisms in succession (FIG. 4). The result is that the video camera 16 captures a sequence of overlapping low resolution tiles of a larger high resolution image of the scene. Each such sequence is complete when the motor 30 has rotated 360°, and therefore the video camera 16 has been lined up in succession with every one of the off-axis mirrors 26 or prisms. The computer 18 software 36 assembles each such complete sequence of overlapping tiles into a single high resolution image. Each such complete high resolution image is identified in computer 18 storage by the time at which it was completed.

The user can view each image, indexed by time of capture, on the computer 18 monitor screen. If the user desires to print the image onto the printer, then methods which are standard practice in the art are used to transfer the reconstituted high resolution image from the computer's 18 internal frame buffer memory 34 to the printer.

Figure 2:
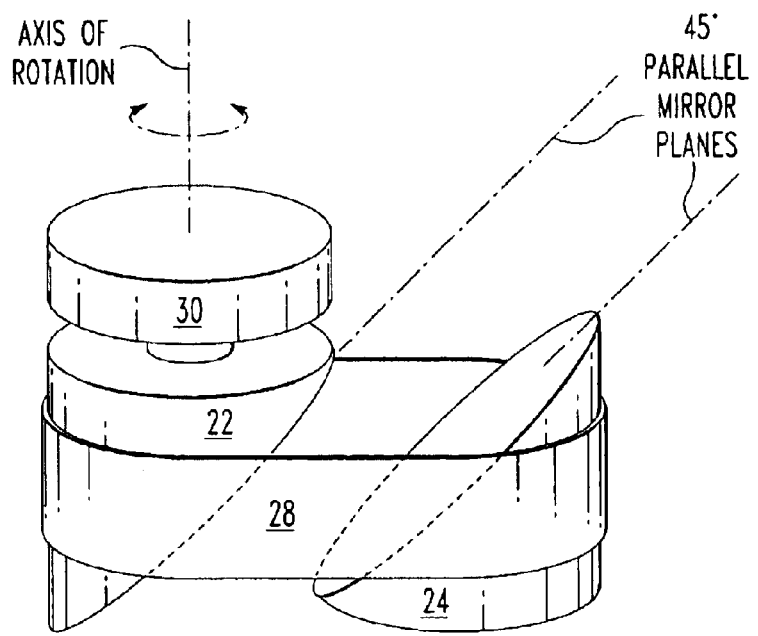
FIG. 2 is a schematic representation of rotating mirrors.

In the preferred embodiment, the on-axis mirror 22 and off-axis mirror 24 are mounted rigidly on a bracket which is rotated by the electric motor 30. Both of these mirrors are rotated 45° with respect to the rotation axis of the motor 30, and are parallel to and facing each other, as shown in FIG. 2.

The entire mechanism of supports and mirrors is made from rigid plastic. The motor 30 and the assemblage of rigid off-axis mirrors 26 or prisms are rigidly mounted to the front of the video camera 16.

In one embodiment, mirrors are front-surface-coated plastic. When stationary off-axis mirrors 26 are used for part, then the entire circularly arranged array of stationary off-axis mirrors 26 is built as a single injection-molded piece. This ensures both low cost of manufacture and assembly, and also that the relative tilt of each such mirror is precise and pre-calibrated.

Figure 5:
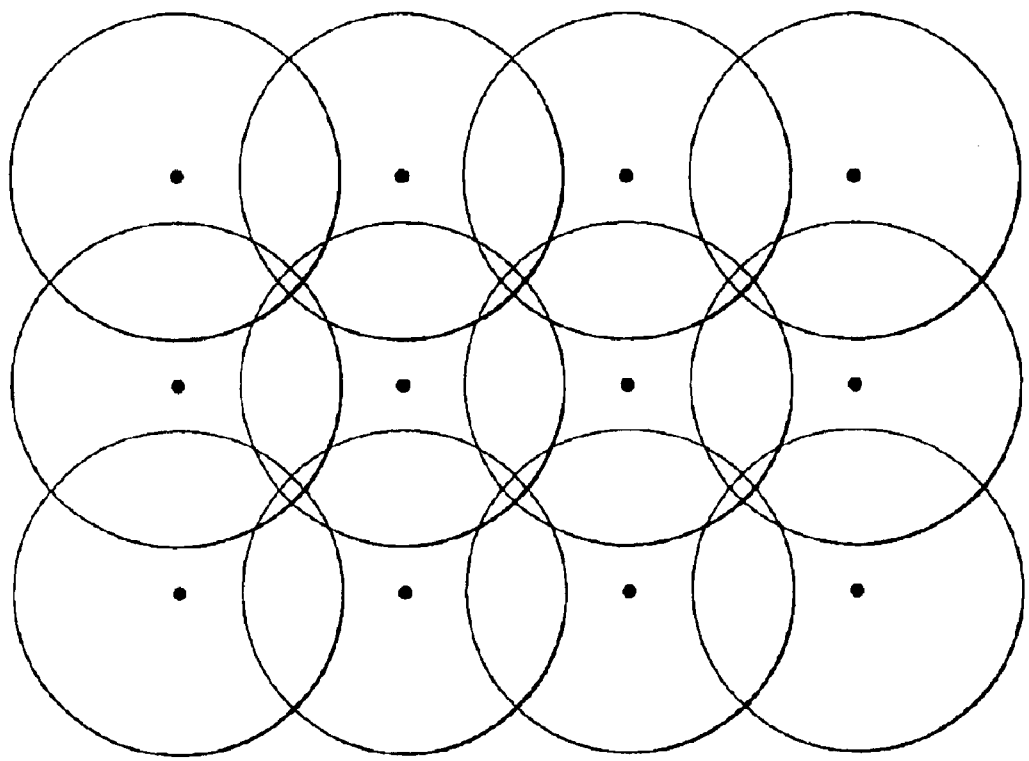
FIG. 5 is a schematic representation of tiling images.

The high resolution image is formed as a tiling pattern of M×N overlapping images (FIG. 5), where MN is the number of circularly arrayed off-axis mirrors 26. For example, to create a 4×3 tiling pattern,12 circularly arrayed off-axis mirrors 26 are used. Each off-axis stationary mirror 26 is assigned an identifier (i,j), where $-\frac{1}{2}M<i<\frac{1}{2}M$ and $-\frac{1}{2}N<j<\frac{1}{2}N$.

Each mirror is tilted slightly with respect to the plane containing the mirror array, so that for each stationary mirror, reflected light is deflected by an angle proportional or nearly proportional to (i X+j Y), where X and Y are the cross-tangent directions in the plane of the mirror array (ie: X and Y are mutually perpendicular, and both are perpendicular to the normal to the plane containing the mirror array).

Alternatively, when stationary prisms are used for part, as shown in FIG. 3, then the entire circularly arranged array of prisms is embedded within a single rigid plane of glass or transparent plastic. As in the mirror embodiment, each prism is assigned an identifier (i,j); using well-known methods for prism optics, each prism varies linearly in thickness in the appropriate direction transverse to the normal to the plane of the glass or plastic such that incoming light is refracted by an angle proportional or nearly proportional to (i X+j Y).

FIG. 3 shows another alternate embodiment, which is limited in the number of views it enables, but which is more compact and is lower in cost of manufacture and assembly, replaces both the stationary off-axis mirrors 26 and the rotating angled off-axis mirror 24 by a ring of angled mirrors, arranged radially around the rotating on-axis mirror 22. Each of these mirrors is curved so as to present to the rotating on-axis mirror 22 a section of the interior of a sphere. Each of these curved mirrors has a different tilt, so as to reflect an image from regions of the scene that are centered at different angular distances from the central optical axis of the video camera 16. A tiled high resolution image can be formed, for example, in an embodiment that employs six such mirrors to image a 3×2 grid of overlapping views, or in an embodiment that employs eight such mirrors to image a 4×2 grid of overlapping views.

The high resolution image is formed in software 36 from each low resolution image as follows. For any given tilt of a deflecting mirror, an image from a particular direction is deflected into the line of sight of the camera 16. The deflection by the mirror causes a perspective linear transformation of the transformed image, precisely as though the camera 16 had been pointing off-axis from its original direction. The mapping of any point (x,y) on this transformed image to the corresponding place in the high resolution scene is described by a perspective linear transformation matrix:

$$A = \begin{matrix} (a,b,c) \\ (d,e,f) \\ (g,h,i) \end{matrix}$$

which is used to effect the deflection-dependent perspective linear transformation:

$$x^1=(ax+by+c)/(gx+hy+i)$$

$$y^1=(dx+ey+f)/(gx+hy+i)$$

There is currently texture mapping hardware on consumer level computers 18 that can compute this particular transformation at interactive rates.

For each mirror j, the associated transformation coefficients for matrix A is precalibrated. Each deflected sub-image is mapped through the precalibrated transformation associated with that sub-image, the result is a set of overlapping regions in the high resolution composite image. To assemble these into a seamless image, a weighted sum to the pixel values is applied at each location, and normalize the result at each pixel.

In addition, the effects of distortions in the deflecting mirrors can be undone by applying a correctional warping transform. For any image $I_j$, in one embodiment, a grid is imposed onto the image, and employ a smooth warping spline within each square of this grid, such as a Catmull-Rom spline, to make local corrections to the x and y coordinates at each pixel, where x and y are each varied as a continuous function of (x,y). The use of this un-warping software 36 allows the use of lighter and less expensive materials, such as inexpensive front-coated plastics, to be used in the construction of the deflecting mirrors.

One embodiment is now described of an algorithm to compute the composite color C[x,y] at pixel (x,y) from a set of transformed images, given that the centroid of each transformed image $I_j$ is located at $center_j$:

Color sumColor=black
float sumWeight=0
for all mapped images $I_j$ that overlap point (x,y)
begin
   vector v=$center_j$−(x,y)
   float rr=$v_x^2+v_y^2+v_z^2$
   sumColor=sumColor+$C_j$[x,y]/rr
   sumWeight=sumWeight+1/rr
end
C[x,y]=sumColor/sumWeight Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for forming an image comprising:
    an image tile capture mechanism for capturing image tiles;
    a mechanism for controlling the image tiles the image tile capture mechanism captures, said controlling mechanism disposed adjacent the image tile capture mechanism, the controlling mechanism includes a mirror system that directs light to the image tile capture mechanism, the mirror system includes a rotating on-axis mirror, the mirror system includes a rotating off-axis mirror that directs light to the on-axis mirror, the mirror system includes stationary off-axis mirrors or prisms disposed such that light is deflected onto the on-axis mirror from the off-axis mirror which then aligns with one of the stationary off-axis mirrors or prisms which create an optical path that allows light to pass through the mirror system into the image tile capture mechanism; and
    a mechanism for combining the image tiles into an image, said combining mechanism connected with the image tile capture mechanism.

2. An apparatus as described in claim 1 wherein the image tile capture mechanism includes a camera.

3. An apparatus as described in claim 2 wherein the controlling mechanism includes a computer which assembles the image tiles into the image.

4. An apparatus as described in claim 3 wherein the controlling mechanism includes a rotating support structure which rotates the rotating on-axis mirror and rotating off-axis mirror.

5. An apparatus as described in claim 4 wherein the rotating on-axis mirror is angled and the rotating off-axis mirror is angled.

6. An apparatus as described in claim 5 wherein the controlling mechanism includes an electric motor which rotates the rotating support structure.

7. An apparatus as described in claim 6 wherein the capturing mechanism includes a digitizing board which digitizes the image tiles captured by the camera.

8. An apparatus as described in claim 7 wherein the capturing mechanism includes a memory connected with the computer in which the image tiles digitized by the digitizing board are stored until the computer combines the image tiles into the image.

9. An apparatus as described in claim 8 wherein the computer includes computer software which processes the image tiles to combine them into the image.

10. An apparatus as described in claim 9 wherein the off-axis angled mirror is parallel to the on-axis angled mirror.

11. An apparatus as described in claim 10 wherein the off-axis mirror, on-axis mirror and the stationary off-axis mirrors or prisms are arranged such that as the electric motor rotates the rotating support structure, the off-axis mirror and on-axis mirror aligns with different stationary off-axis mirrors or prisms in succession to cause the camera to capture the sequence of overlapping image tiles until the motor has rotated 360 degrees.

12. A method for forming an image comprising:
controlling which image tiles of the image are captured by an image tile capture mechanism;
capturing the image tiles with an off-axis mirror of a mirror system that reflects light of the image to an on-axis mirror of the mirror system, the mirror system includes stationary off-axis mirrors or prisms disposed such that light is deflected onto the on-axis mirror from the off-axis mirror which then aligns with one-of the stationary off-axis mirrors or prisms which create an optical path that allows light to pass through the mirror system into the image tile capture mechanism; and
combining the image tiles into the image.

13. An apparatus for forming an image comprising:
an image tile capture mechanism for capturing image tiles,
a mechanism for controlling the image tiles the image tile capture mechanism captures, said controlling mechanism disposed adjacent the image tile capture mechanism, the controlling mechanism includes a mirror system that directs; light to the image tile capture mechanism, the mirror system includes a rotating on-axis mirror, the mirror system includes a ring of angled curved mirrors arranged radially around the rotating on-axis mirrors so as to present the rotating on-axis mirror a section of an interior of a sphere that directs light to the on-axis mirror, each of the angled curved mirrors has a different tilt so as to reflect an image from regions of a scene that are centered at different annular distances from a central optical axis of the image tile capture mechanism; and
a mechanism for combining the image tiles into an image, said combining mechanism connected with the image tile capture mechanism.

* * * * *